US008707772B2

(12) United States Patent
Kondo et al.

(10) Patent No.: US 8,707,772 B2
(45) Date of Patent: Apr. 29, 2014

(54) ELECTRONIC COMPONENT DEVICE PROVIDED WITH COUNTERMEASURE FOR ELECTRICAL NOISE

(75) Inventors: Jun Kondo, Nagoya (JP); Kazufumi Serizawa, Kariya (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 13/435,345

(22) Filed: Mar. 30, 2012

(65) Prior Publication Data

US 2012/0247193 A1 Oct. 4, 2012

(30) Foreign Application Priority Data

Apr. 1, 2011 (JP) ................................ 2011-081934

(51) Int. Cl.
*G01M 15/04* (2006.01)

(52) U.S. Cl.
USPC ...................................................... 73/114.43

(58) Field of Classification Search
USPC ...................................................... 73/114.43
See application file for complete search history.

(56) References Cited

U.S. PATENT DOCUMENTS

| | | | | |
|---|---|---|---|---|
| 6,512,255 | B2 * | 1/2003 | Aoki et al. | 257/254 |
| 7,918,128 | B2 * | 4/2011 | Kondo et al. | 73/114.43 |
| 2008/0131058 | A1 * | 6/2008 | Tsunoda et al. | 385/75 |
| 2010/0252002 | A1 | 10/2010 | Fujino et al. | |
| 2012/0247195 | A1 * | 10/2012 | Kondo et al. | 73/114.51 |

FOREIGN PATENT DOCUMENTS

JP 2010-242574 10/2010

* cited by examiner

*Primary Examiner* — Freddie Kirkland, III
(74) *Attorney, Agent, or Firm* — Nixon & Vanderhye PC

(57) ABSTRACT

The electronic component device includes an electronic component such as a pressure sensor for detecting pressure of fuel injected into an internal combustion engine, an insulating member made of an insulative resin and sealing the electronic component, and a shield member made of a conductive resin and surrounding the insulating member.

15 Claims, 2 Drawing Sheets

ELECTRONIC COMPONENT DEVICE PROVIDED WITH COUNTERMEASURE FOR ELECTRICAL NOISE

This application claims priority to Japanese Patent Application No. 2011-81934 filed on Apr. 1, 2011, the entire contents of which are hereby incorporated by reference.

BACKGROUND OF THE INVENTION

1. Field of the Invention The present invention relates to an electronic component device having a countermeasure for electrical noise.

2. Description of Related Art

As described, for example, in Japanese Patent Application Laid-open No. 2010-242574, it is known that an electronic component which has to be resistant to electrical noise such as a sensor circuit included in an electronic component device is surrounded by a shield member made of a metal plate.

In this case, it is preferable to determine the shape of the shield material in accordance with the shape of the electronic component from the viewpoint of assembly ease and space saving. However, since the shield material is made of a metal plate, it is difficult to work the shield member into a complicated shape. Hence, such a conventional electronic component device has a problem in achieving assembly ease and space saving because of its shield member.

SUMMARY

A first exemplary embodiment provides an electronic component device comprising:

an electronic component;

an insulating member made of an insulative resin and sealing the electronic component; and a shield member made of a conductive resin and surrounding the insulating member.

A second exemplary embodiment provides an electronic component device in which a terminal is connected to an electronic component for outputting an electrical signal indicative of a detected physical quantity at one end portion thereof, and is exposed within a connector case made of a resin at the other end portion thereof, comprising:

an insulating member made of an insulative resin and sealing the electronic component and the one end portion of the terminal; and a shield member made of a conductive resin and integrally formed with a shield portion surrounding the insulating member and the connector case.

A third exemplary embodiment provides an electronic component device in which a terminal is connected to an electronic component for outputting an electrical signal indicative of a detected physical quantity, and is exposed within a connector case made of a resin at the other end portion thereof, comprising:

an insulating member made of an insulative resin and sealing the electronic component and the one end portion of the terminal; and a shield member made of a conductive resin, and formed separately from the connector case so as to surround the insulating member.

According to the first to third exemplary embodiments, there is provided an electronic component device provided with a countermeasure for electrical noise which is compact in size.

Other advantages and features of the invention will become apparent from the following description including the drawings and claims.

PREFERED EMBODIMENTS OF THE INVENTION

Figure 1:
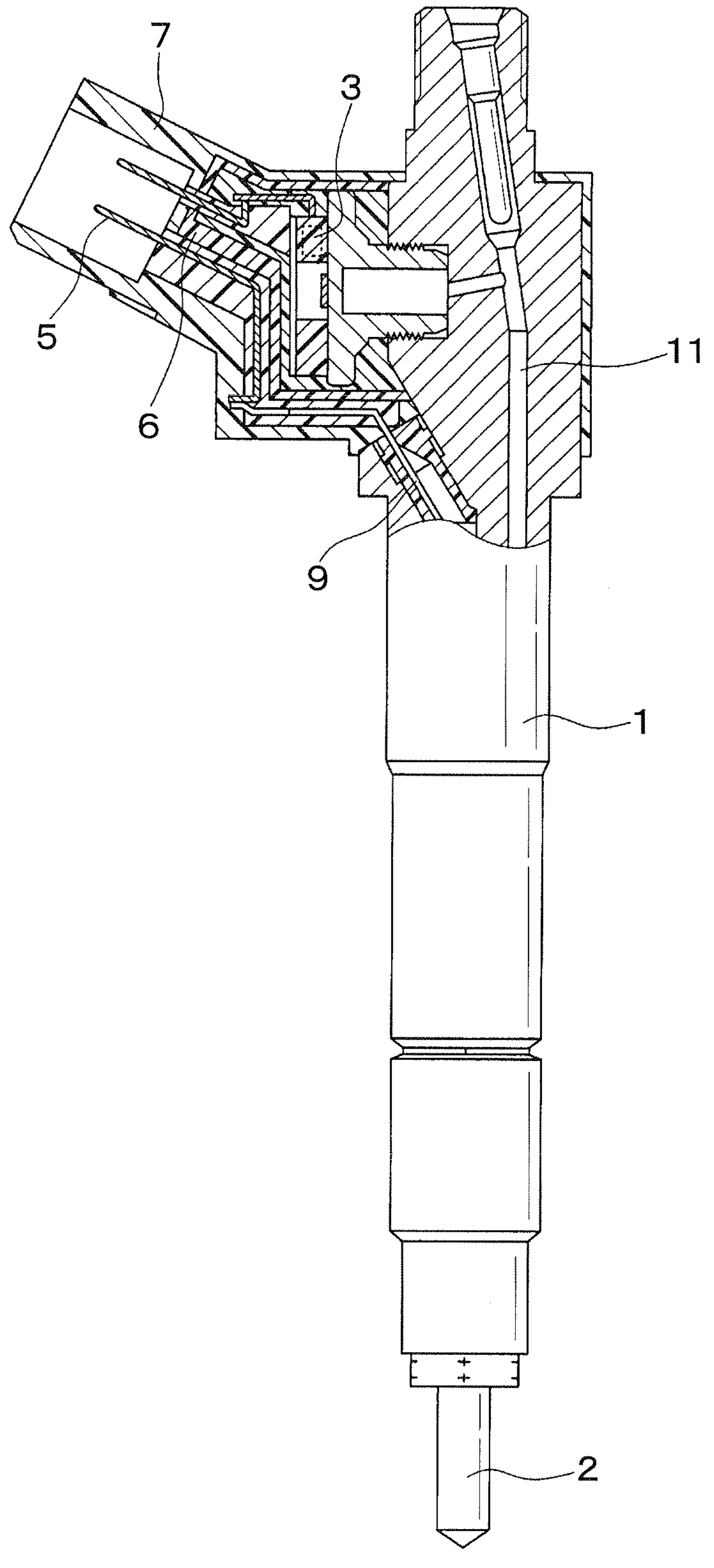
FIG. 1 is a partial cross-sectional view of an electronic component device according to a first embodiment of the invention.

In the following, the same or equivalent parts are denoted by the same reference numerals.

First Embodiment

Figure 2:
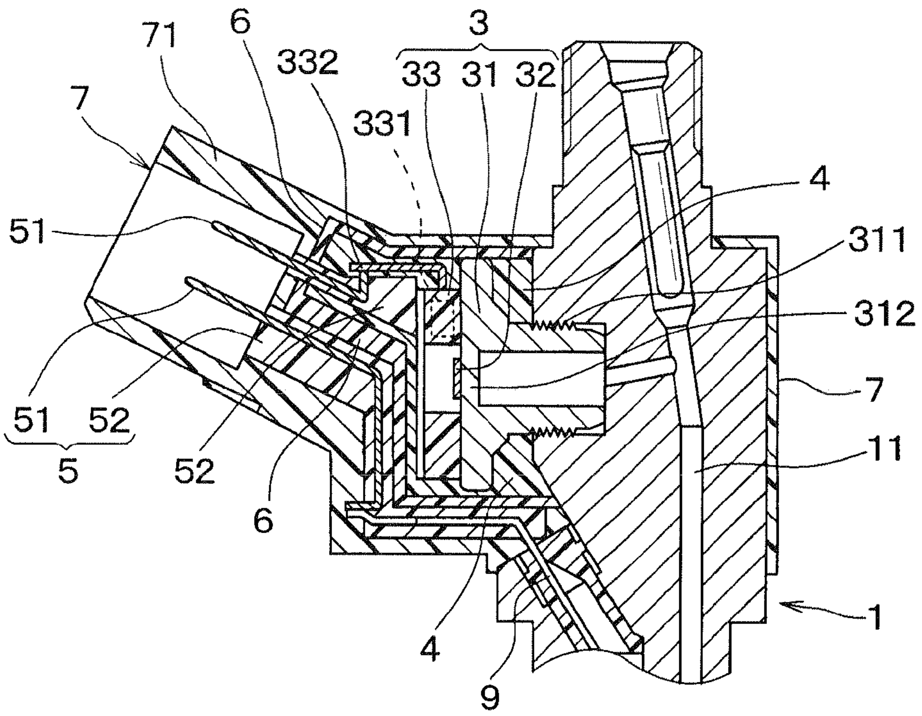
FIG. 2 is an enlarged cross-sectional view of a main part of the electronic component device shown in FIG. 1.

FIG. 1 is a partial cross-sectional view of an injector as an electronic component device according to a first embodiment of the invention. FIG. 2 is an enlarged cross-sectional view of a main part of the injector shown in FIG. 1.

As shown in FIG. 1, the injector includes a metal body 1 in which a high-pressure channel 11 through which high-pressure fuel supplied from a common rail (not shown) flows is provided. The high-pressure fuel is injected from a nozzle 2 fitted to the lower end of the body 1 into a diesel internal combustion engine (not shown).

As shown in FIG. 2, a sensor 3 as an electronic component for outputting an electrical signal indicative of a detected physical quantity is threadably mounted on the outer periphery of the body 1 in the vicinity of the upper end of the body 1. The sensor 3 is for detecting the pressure within the high-pressure channel 11, that is, the pressure of the fuel injected into the diesel internal combustion engine. The sensor 3 is constituted of a metal housing 31, a sensor portion 32 and a molded IC 33.

The housing 31 includes a male thread portion 311 for thread engagement with the body 1, and a thin-wall portion 312 which deforms in accordance with the fuel pressure within the high-pressure channel 11. The sensor portion 32, which is adhered to the thin-wall portion 312, changes its resistance with deformation of the thin-wall portion 312 (that is, with change of the fuel pressure within the high-pressure channel 11). The molded IC 33 includes a signal processing IC 331 for outputting an electrical signal indicative of the resistance of the sensor portion 32, that is, the fuel pressure, and a contact 332 electrically connected to the signal processing IC 331.

A part of the housing 31, the sensor portion 32 and the molded IC 33 are sealed by a sensor insulating member 4 made of an insulative resin.

A terminal group 5 is disposed in the vicinity of the molded IC 33. The terminal group 5 includes terminals 51 and terminal insulating members 52 made of an insulative resin covering intermediate portions of the terminals 51.

Some of the terminals 51 are connected to the contact 332 of the sensor 3 at their one ends which are sealed by the sensor insulating member 4 together with the contact 332.

The other terminals 51 are connected to one end of a lead 9 at their one ends. The other end of the lead 9 is connected to a piezo stack (not shown) constituting part of a mechanism for opening and closing the nozzle 2.

The sensor insulating member 4 and part of the terminal group 5 are surrounded by a shield member 6 made of a conductive resin. The inside of the sensor 3 is surrounded by the shield member 6 and the housing 31. The shield member 6 abuts on the body 1, and grounded through the body 1.

The shield member 6 is surrounded by a connector case 7 made of an insulative resin. The other ends of all the terminals 51 are exposed inside a tubular portion 71 of the connector case 7 to be connected to a not-shown external connector. The connector case 7 and the shield member 6 are formed separately.

In this embodiment, the sensor insulating member 4 is primarily formed in a state where the sensor 3 is threaded onto the body 1 and the terminal group 5 is disposed in a predetermined position, the shield member 6 is secondarily formed thereafter, and the connector case 7 is thirdly formed.

The injector having the above described structure outputs the electrical signal indicative of the fuel pressure from the sensor 3 to a not-shown engine control ECU. Since each of the shield member 6 and the housing 31 is electrically conductive, and accordingly has electromagnetic shielding properties, electrical noise can be prevented from entering the space in which the sensor portion 32 and the molded IC 33 are disposed.

Further, since the shield member 6 is made of a resin, and accordingly more flexible in shape than when it is made of a metal plate, it is possible to save the space for installing the shield member 6.

Further, since the connector case 7 is formed separately from the shield member 6, the material of the connector case 7 can be selected from wide range of materials. For example, the connector case 7 can be made of a high-strength material.

Second Embodiment

Figure 3:
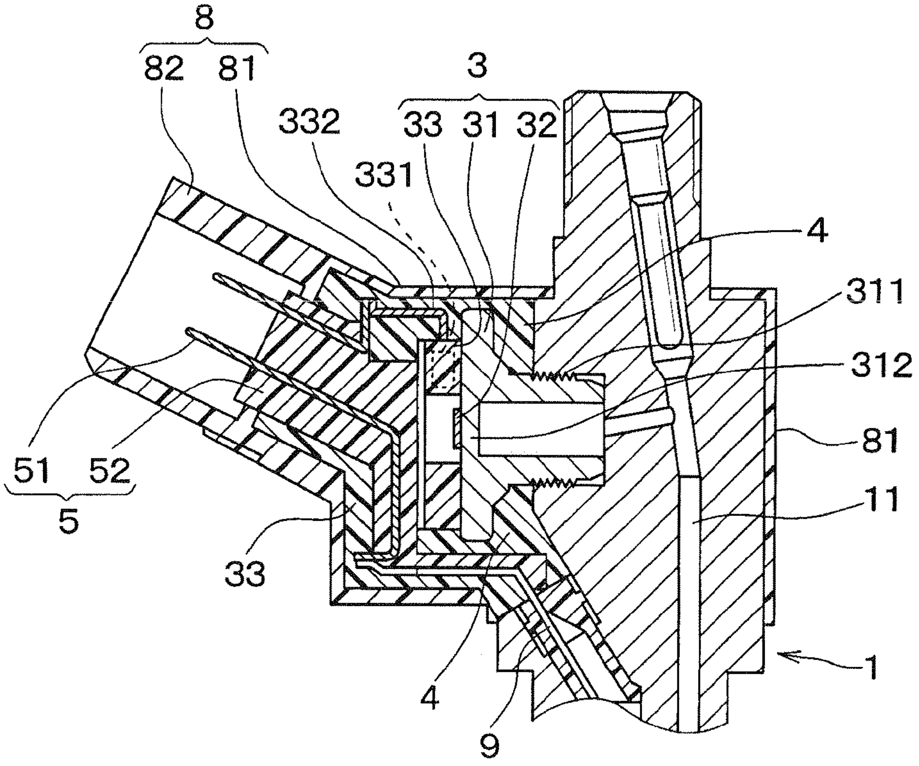
FIG. 3 is an enlarged cross-sectional view of a main part of an electronic component device according to a second embodiment of the invention.

Next, a second embodiment of the invention is described. FIG. 3 is an enlarged cross-sectional view of a main part of an electronic component device according to the second embodiment of the invention. The following description of the second embodiment focuses on differences with the first embodiment.

As shown in FIG. 3, in the second embodiment, a shield member 8 made of a conductive resin is integrally formed with a shield portion 81 surrounding the sensor insulating member 4 and a connector case portion 82 surrounding the exposed ends of the terminals 51.

In this embodiment, the sensor insulating member 4 is primarily formed in a state where the sensor 3 is threaded onto the body 1 and the terminal group 5 is disposed in a predetermined position, and the shield member 8 is secondarily formed.

According to the second embodiment, by the provision of the shield member 8 and the shield portion 81 of the housing 31, electrical noise can be prevented from entering the space in which the sensor portion 32 and the molded IC 33 are disposed, and also the space for installing the shield member 8 can be saved like the first embodiment.

Further, since the shield portion 81 and the connector case portion 82 are integrally formed, the injector of this embodiment can be manufactured without adding an additional work step.

Other Embodiments

The above embodiments are directed to injectors. However, the present invention can be applied to various electronic component devices other than injectors.

In the above embodiments, the electronic component device includes a sensor as an electronic component. However, the present invention can be applied to various electronic component devices including an electronic component other than a sensor for measuring physical quantity.

In the above embodiments, the electronic component is a pressure measuring sensor. However, the present invention can be applied to various electronic component devices including a sensor for measuring physical quantity other than pressure.

The above explained preferred embodiments are exemplary of the invention of the present application which is described solely by the claims appended below. It should be understood that modifications of the preferred embodiments may be made as would occur to one of skill in the art.

What is claimed is:

1. An electronic component device comprising:

an electronic component;

an insulating member made of an insulative resin and sealing the electronic component; and a shield member made of a conductive resin and surrounding the insulating member along a shape of the insulating member.

2. The electronic component device according to claim 1, wherein the electronic component is a pressure sensor for detecting pressure of fuel injected to an internal combustion engine.

3. The electronic component device according to claim 2, wherein the pressure sensor is mounted on a metal body of an injector, and the shield member is grounded through the metal body.

4. The electronic component device according to claim 1, wherein the shield member is an electromagnetic shield member.

5. The electronic component device according to claim 1, wherein the shield member is configured to prevent electrical noise from entering a space in which the electronic component is disposed.

6. An electronic component device in which a terminal is connected to an electronic component for outputting an electrical signal indicative of a detected physical quantity at one end portion thereof, and is exposed within a connector case made of a resin at the other end portion thereof, comprising:

an insulating member made of an insulative resin which seals the electronic component and the one end portion of the terminal; and a shield member made of a conductive resin and integrally formed with a shield portion surrounding the insulating member along a shape of the insulating member and the connector case.

7. The electronic component device according to claim 6, wherein the electronic component is a pressure sensor for detecting pressure of fuel injected to an internal combustion engine.

8. The electronic component device according to claim 7, wherein the pressure sensor is mounted on a metal body of an injector, and the shield member is grounded through the metal body.

9. The electronic component device according to claim 6, wherein the shield member is an electromagnetic shield member.

10. The electronic component device according to claim 6, wherein the shield member is configured to prevent electrical noise from entering a space in which the electronic component is disposed.

11. An electronic component device in which a terminal is connected to an electronic component for outputting an electrical signal indicative of a detected physical quantity, and is exposed within a connector case made of a resin at the other end portion thereof, comprising:

an insulating member made of an insulative resin and sealing the electronic component and the one end portion of the terminal; and a shield member made of a conductive resin, and formed separately from the connector case so as to surround the insulating member along a shape of the insulating member.

12. The electronic component device according to claim 11, wherein the electronic component is a pressure sensor for detecting pressure of fuel injected to an internal combustion engine.

13. The electronic component device according to claim 12, wherein the pressure sensor is mounted on a metal body of an injector, and the shield member is grounded through the metal body.

14. The electronic component device according to claim 11, wherein the shield member is an electromagnetic shield member.

15. The electronic component device according to claim 11, wherein the shield member is configured to prevent electrical noise from entering a space in which the electronic component is disposed.

* * * * *